(12) United States Patent
Nishimura

(10) Patent No.: US 12,015,280 B2
(45) Date of Patent: Jun. 18, 2024

(54) CONTACTLESS POWER FEEDING FACILITY

(71) Applicant: Daifuku Co., Ltd., Osaka (JP)

(72) Inventor: Keiji Nishimura, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 17 days.

(21) Appl. No.: 18/100,796

(22) Filed: Jan. 24, 2023

(65) Prior Publication Data
US 2023/0238832 A1    Jul. 27, 2023

(30) Foreign Application Priority Data
Jan. 25, 2022   (JP) .................................. 2022-009477

(51) Int. Cl.
*H02J 50/40* (2016.01)
*H02J 50/10* (2016.01)

(52) U.S. Cl.
CPC ............. *H02J 50/40* (2016.02); *H02J 50/10* (2016.02)

(58) Field of Classification Search
CPC .................................. H02J 50/40; H02J 50/00
See application file for complete search history.

(56) References Cited

U.S. PATENT DOCUMENTS

2009/0003022 A1*   1/2009   Nunoya ................... H02J 50/40
                                                        363/78

FOREIGN PATENT DOCUMENTS

JP              200267747 A      3/2002

* cited by examiner

*Primary Examiner* — Carlos Amaya
(74) *Attorney, Agent, or Firm* — The Webb Law Firm

(57) ABSTRACT

A synchronization system includes a master unit and a slave unit. The slave unit is connected to the master unit directly, or indirectly via another slave unit, and is connected to at least one power supply device. The master unit transmits, to master downstream equipment, a first adjusted signal advanced in phase relative to a reference phase by a time corresponding to a time required to transmit a synchronization signal from the master unit to the master downstream equipment. The slave unit transmits, to slave downstream equipment, a second adjusted signal advanced in phase relative to a phase of the synchronization signal received from slave upstream equipment by a time corresponding to a sum of a time required to transmit the synchronization signal from the slave unit to the slave downstream equipment, and a processing time of the synchronization signal inside the slave unit.

6 Claims, 7 Drawing Sheets

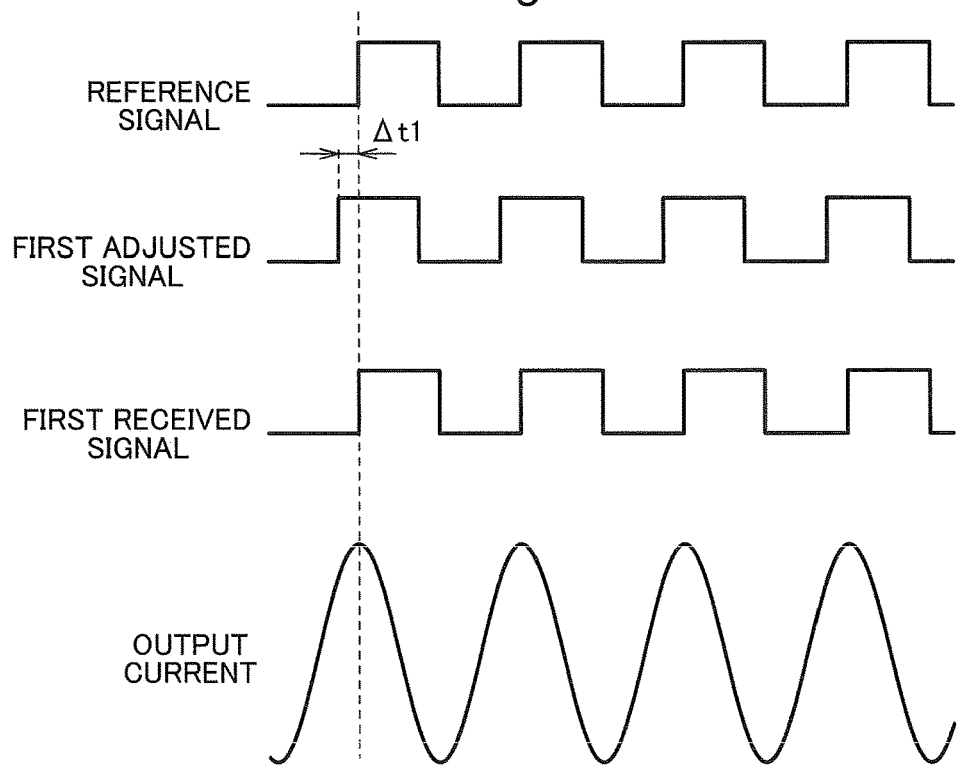
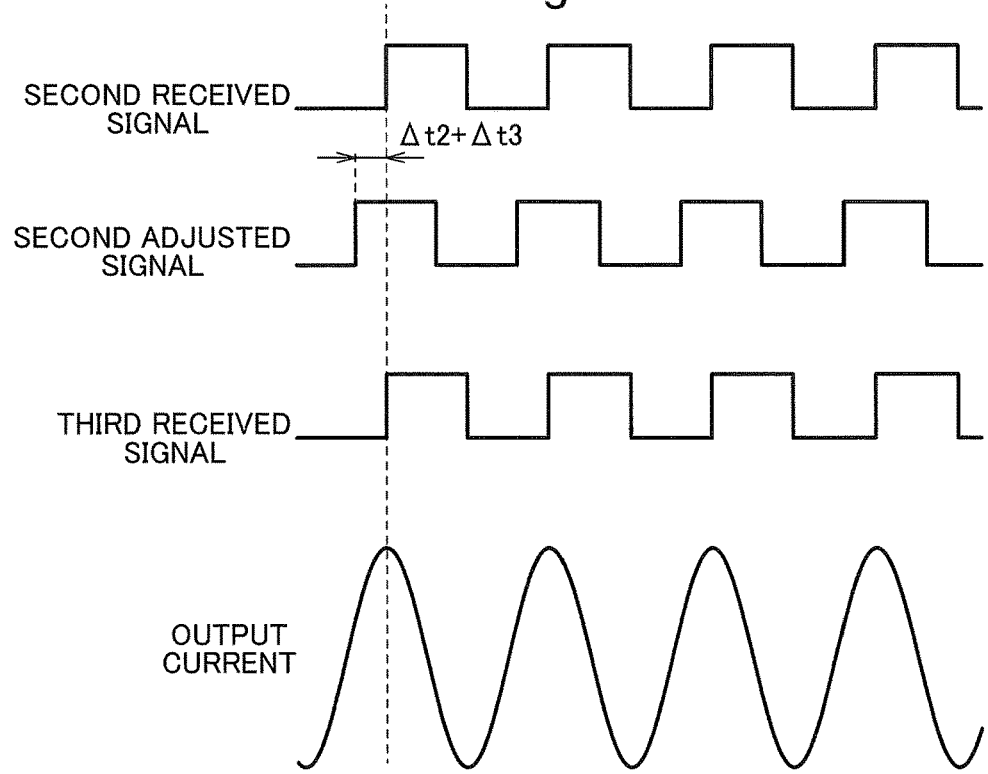

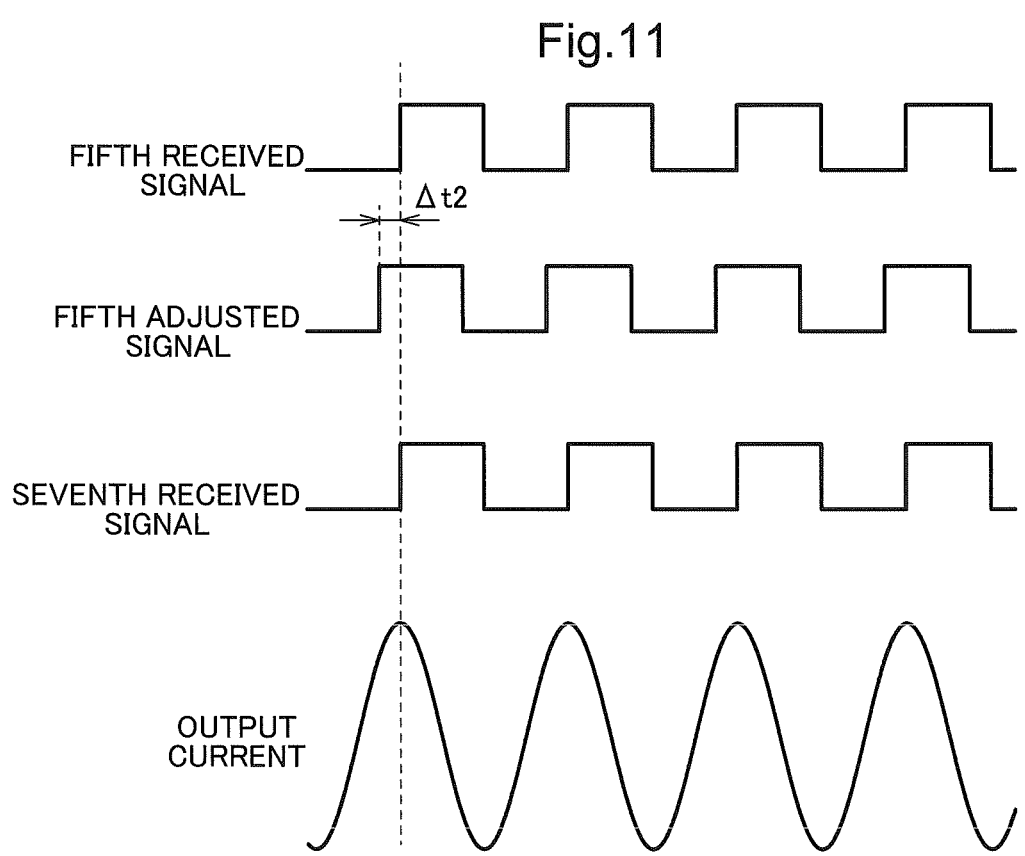

CONTACTLESS POWER FEEDING FACILITY

CROSS-REFERENCE TO RELATED APPLICATION

This application claims priority to Japanese Patent Application No. 2022-009477 filed Jan. 25, 2022, the disclosure of which is hereby incorporated by reference in its entirety.

BACKGROUND OF THE INVENTION

1. Field of the Invention

The present invention relates to a contactless power feeding facility configured to supply power in a contactless manner to a power receiving device, the contactless power feeding facility including a plurality of power feeding lines side by side along a movement path of a moving body including the power receiving device and a plurality of power supply devices respectively connected to the power feeding lines and configured to supply alternating currents to the power feeding lines.

2. Description of the Related Art

An example of such a contactless power feeding facility is disclosed in JP 2002-67747A (hereinafter referred to as "Patent Document 1"). In the following, the reference numerals described in Patent Document 1 are cited in the parentheses in the description of the related art.

In the contactless power feeding facility disclosed in Patent Document 1, a master unit (51(A)) transmits a synchronization signal to a plurality of slave units (51). Then, power supply devices (M) that are respectively connected to the plurality of slave units (51) supply alternating currents to the corresponding power feeding lines (47), based on the synchronization signal received by the slave units (51). In this manner, the phases of the alternating current supplied to the power feeding lines (47) are synchronized.

Meanwhile, in the contactless power feeding facility described above, the time required to transmit the synchronization signal from the master unit to each of the power supply devices depends on the mode of connection of the power supply device to the master unit. Therefore, the time required to transmit the synchronization signal from the master unit to the power supply devices may differ for each power supply device. However, the contactless power feeding facility disclosed in Patent Document 1 does not take into account such differences in the required transmission time, and, in that respect, is limited in terms of increasing the accuracy in synchronizing the phases of the alternating current supplied to the power feeding lines.

SUMMARY OF THE INVENTION

Therefore, it is desirable to realize a contactless power feeding facility capable of increasing the accuracy in synchronizing the phases of alternating current supplied to a plurality of power feeding lines.

In view of the foregoing, a characteristic feature of a contactless power feeding facility lies in a contactless power feeding facility configured to supply power in a contactless manner to a power receiving device, the contactless power feeding facility including:

a plurality of power feeding lines side by side along a movement path of a moving body including the power receiving device; and a plurality of power supply devices respectively connected to the power feeding lines and configured to supply alternating currents to the power feeding lines, wherein the contactless power feeding facility further includes a synchronization system configured to synchronize phases of the alternating currents of the plurality of power supply devices, the synchronization system includes:

a master unit configured to transmit a synchronization signal having a predetermined period; and at least one slave unit connected downstream to the master unit and configured to receive the synchronization signal from the master unit, the slave unit is directly connected to the master unit, or indirectly connected to the master unit via another slave unit, and is further connected to at least one of the power supply devices, the master unit is configured to (i) compute a first adjusted signal, which is the synchronization signal advanced in phase relative to a reference phase by a time corresponding to a first required time, which is a time required to transmit the synchronization signal from the master unit to master downstream equipment, which is a slave unit directly connected downstream to the master unit, and (ii) transmit the first adjusted signal to the master downstream equipment, and the slave unit is configured to:

compute a second adjusted signal advanced in phase relative to a phase of the synchronization signal received from slave upstream equipment, which is the master unit or another slave unit directly connected upstream to the slave unit, by a time corresponding to a sum of (i) a second required time, which is a time required to transmit the synchronization signal from the slave unit to slave downstream equipment, which includes a power supply device and another slave unit directly connected downstream to the slave unit, and (ii) a processing time of the synchronization signal inside the slave unit; and transmit the second adjusted signal to the slave downstream equipment.

According to this characteristic feature, the master unit computes the first adjusted signal taking into account a delay corresponding to the time required to transmit the synchronization signal from the master unit to the master downstream equipment. Accordingly, the phase of the synchronization signal received by the master downstream equipment from the master unit can be very close to the reference phase.

According to this characteristic feature, the slave unit computes the second adjusted signal taking into account a delay corresponding to the time required to transmit the synchronization signal from the slave unit to the slave downstream equipment, and the processing time of the synchronization signal inside the slave unit. Accordingly, the phase of the synchronization signal received by the slave downstream equipment from the slave unit can be very close to the phase of the synchronization signal received by the slave unit from the slave upstream equipment.

As described above, according to this characteristic feature, the phase of the synchronization signal received by the plurality of power supply devices and the slave unit can be very close to the reference phase. Therefore, even in the case where the time required to transmit the synchronization signal from the master unit to the plurality of power supply devices varies, the phases of the alternating currents respectively supplied by the plurality of power supply devices to the corresponding power feeding lines can be appropriately synchronized. Accordingly, it is possible to increase the accuracy in synchronizing the phases of the alternating currents supplied to the plurality of power feeding lines.

In view of the foregoing, a characteristic feature of a contactless power feeding facility lies in a contactless power feeding facility configured to supply power in a contactless manner to a power receiving device, the contactless power feeding facility including:

a plurality of power feeding lines side by side along a movement path of a moving body including the power receiving device; and a plurality of power supply devices respectively connected to the power feeding lines and configured to supply alternating currents to the power feeding lines, wherein the contactless power feeding facility further includes a synchronization system configured to synchronize phases of the alternating currents of the plurality of power supply devices, the synchronization system includes:
  a master unit configured to transmit a synchronization signal having a predetermined period; and
  at least one slave unit connected downstream to the master unit and configured to receive the synchronization signal from the master unit,
the slave unit is directly connected to the master unit, or indirectly connected to the master unit via another slave unit, and is further connected to at least one of the power supply devices, the master unit is configured to (i) compute a third adjusted signal, which is the synchronization signal advanced in phase relative to a reference phase by a time corresponding to a sum of a first required time, which is a time required to transmit the synchronization signal from the master unit to master downstream equipment, which is a slave unit directly connected downstream to the master unit, and a processing time of the synchronization signal inside the master downstream equipment, and (ii) transmit the third adjusted signal to the master downstream equipment, and the slave unit is configured to:
  in response to slave downstream equipment, which includes one of the plurality of power supply devices and another slave unit directly connected downstream to the slave unit, being another slave unit directly connected downstream to the slave unit, compute a fourth adjusted signal advanced in phase relative to a phase of the synchronization signal received from slave upstream equipment, which is the master unit or another slave unit directly connected upstream to the slave unit, by a time corresponding to a sum of (i) a second required time, which is a time required to transmit the synchronization signal from the slave unit to the slave downstream equipment, and (ii) a processing time of the synchronization signal inside the slave downstream equipment, and transmit the fourth adjusted signal to the slave downstream equipment; and
  in response to the slave downstream equipment being the one of the plurality of power supply devices directly connected downstream to the slave unit, compute a fifth adjusted signal advanced in phase relative to a phase of the synchronization signal received from the slave upstream equipment by a time corresponding to the second required time, and transmit the fifth adjusted signal to the slave downstream equipment.

According to this characteristic feature, the master unit computes the third adjusted signal taking into account a delay corresponding to the time required to transmit the synchronization signal from the master unit to the master downstream equipment, and the processing time of the synchronization signal inside the master downstream equipment. Accordingly, the phase of the synchronization signal received by the master downstream equipment from the master unit can be very close to the reference phase.

According to this characteristic feature, if the slave downstream equipment is another slave unit, the slave unit computes the fourth adjusted signal taking into account a delay corresponding to the time required to transmit the synchronization signal from the slave unit to the slave downstream equipment, and the processing time of the synchronization signal inside the slave downstream equipment. If the slave downstream equipment is the power supply device, the slave unit computes the fifth adjusted signal taking into account a delay corresponding to the time required to transmit the synchronization signal from the slave unit to the slave downstream equipment. Accordingly, the phase of the synchronization signal received by the slave downstream equipment from the slave unit can be very close to the phase of the synchronization signal received by the slave unit from the slave upstream equipment.

As described above, according to this characteristic feature, the phase of the synchronization signal received by the plurality of power supply devices and the slave unit can be very close to the reference phase. Therefore, even in the case where the time required to transmit the synchronization signal from the master unit to the plurality of power supply devices varies, the phases of the alternating currents respectively supplied by the plurality of power supply devices to the corresponding power feeding lines can be appropriately synchronized. Accordingly, it is possible to increase the accuracy in synchronizing the phases of the alternating currents supplied to the plurality of power feeding lines.

BRIEF DESCRIPTION OF THE DRAWINGS

FIG. 7 is a diagram showing phases at various points in time of a synchronization signal transmitted from the master unit to the master downstream equipment, and a phase of an alternating current supplied to a power feeding line in accordance with the synchronization signal, according to the first embodiment.

FIG. 8 is a diagram showing phases at various points in time of a synchronization signal transmitted from the slave unit to the slave downstream equipment, and a phase of an alternating current supplied to a power feeding line in accordance with the synchronization signal, according to the first embodiment.

FIG. 11 is a diagram showing phases at various points in time of a synchronization signal transmitted from a slave unit to a power supply device serving as slave downstream equipment, and a phase of an alternating current supplied to a power feeding line in accordance with the synchronization signal, according to the second embodiment.

DESCRIPTION OF THE INVENTION

1. First Embodiment

A contactless power feeding facility 100 according to a first embodiment will be described below with reference to the drawings. In the present embodiment, the contactless power feeding facility 100 is provided in an article transport facility 200.

Figure 1:
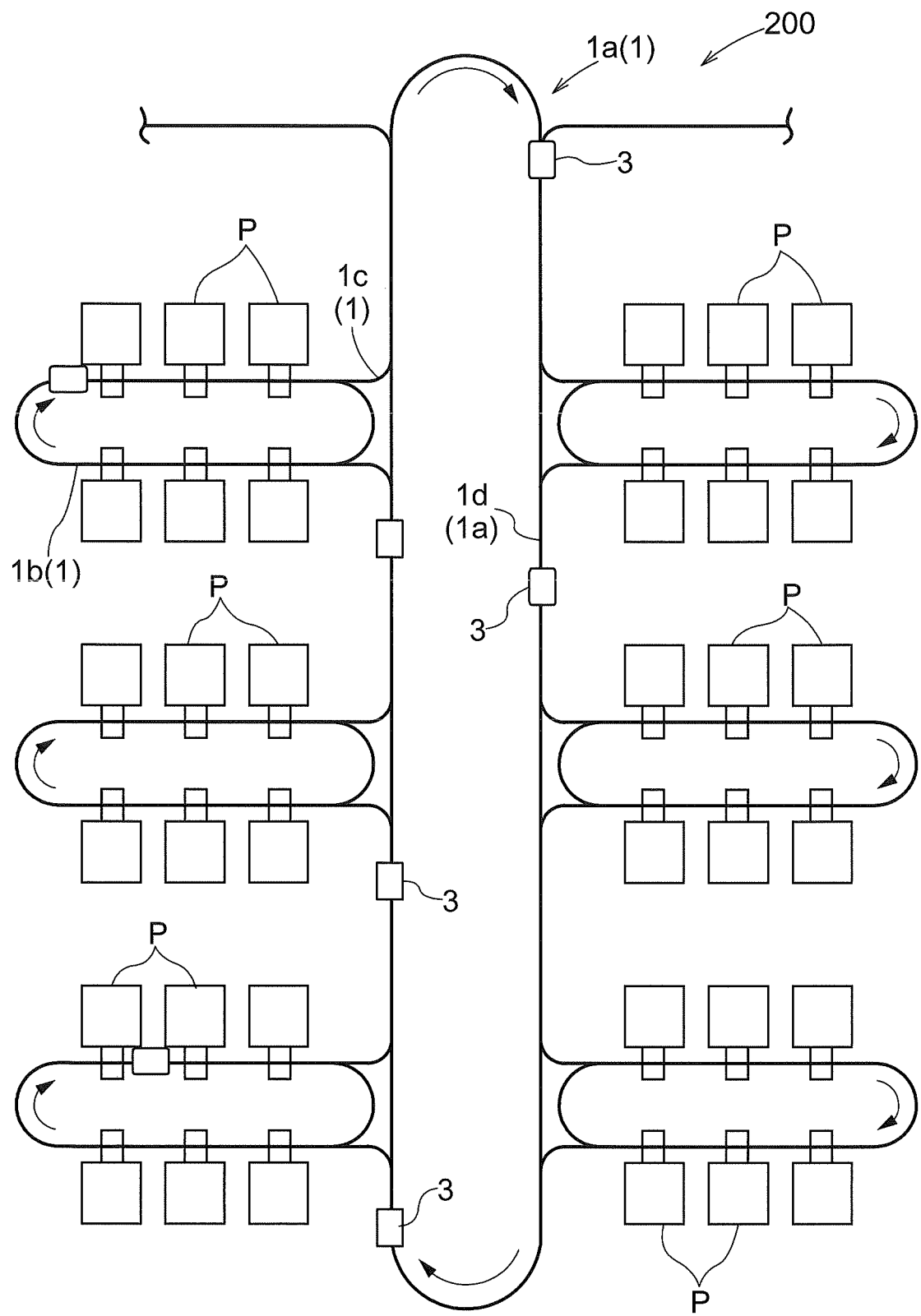
FIG. 1 is a plan view of an article transport facility that includes a contactless power feeding facility according to a first embodiment.
Figure 2:
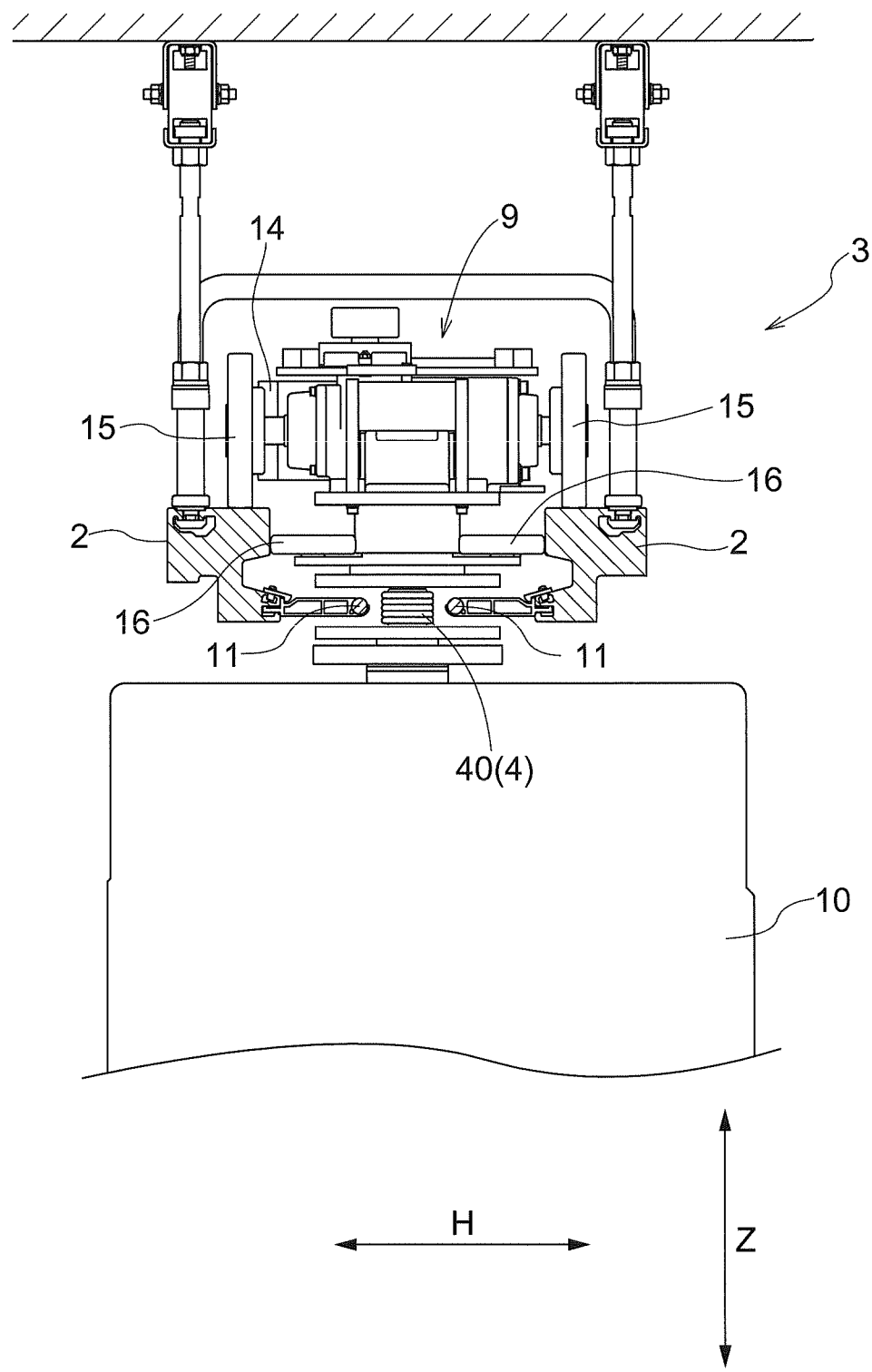
FIG. 2 is a front view of an article transport vehicle included in the article transport facility.

As shown in FIGS. 1 and 2, the article transport facility 200 includes travel rails 2 and a moving body 3. The travel rails 2 are disposed along a movement path 1 of the moving body 3. In the present embodiment, a pair of travel rails 2 are suspended and supported from a ceiling in an up-down view taken in an up-down direction Z, which is a vertical direction, while being spaced apart from each other with a predetermined interval in a path width direction H, which is a direction orthogonal to the movement path 1 (see FIG. 2). In the present embodiment, the moving body 3 is an article transport vehicle that is guided by the travel rails 2 and travels along the movement path 1. An article to be transported by the moving body 3 serving as the article transport vehicle may be, for example, a FOUP (Front Opening Unified Pod) that accommodates semiconductor substrates, a glass substrate serving as a material of a display, or the like.

As shown in FIG. 1, in the present embodiment, the movement path 1 includes one main path 1a formed in an annular shape, a plurality of sub-paths 1b each formed in an annular shape passing through a plurality of article processing sections P, and a plurality of connection paths 1c that connect the main path 1a to the plurality of sub-paths 1b.

As shown in FIG. 2, the moving body 3 includes a power receiving device 4 that receives driving power in a contactless manner from power feeding lines 11 provided along the movement path 1. In the present embodiment, the moving body 3 further includes a traveler 9 that is guided by the pair of travel rails 2 and travels along the movement path 1, and a transport vehicle main body 10 that is located below the travel rails 2, and is suspended from and supported by the traveler 9.

The traveler 9 includes a drive motor 14 and a pair of travel wheels 15. The drive motor 14 is a driving power source of the pair of travel wheels 15. The pair of travel wheels 15 are driven to rotate by the drive motor 14. The travel wheels 15 roll on traveling surfaces that are formed by the respective upper surfaces of the travel rails 2. In the present embodiment, the traveler 9 further includes a pair of guide wheels 16. The pair of guide wheels 16 are supported rotatably about an axis extending in the up-down direction Z. The pair of guide wheels 16 are disposed abutting a pair of inner surfaces of the pair of travel rails 2 that oppose each other in the path width direction H.

The transport vehicle main body 10 includes an article supporter that is supported in such a manner as to be freely raised and lowered relative to the traveler 9, and that suspends and supports an article, and an actuator that raises and lowers the article supporter (neither are shown).

Power to be supplied to the above-described drive motor 14, various actuators, and the like is supplied in a contactless manner from the power feeding lines 11 to the power receiving device 4. As described above, the power feeding lines 11 for supplying the driving power of the moving body 3 to the power receiving device 4 are provided along the movement path 1. In the present embodiment, the power feeding lines 11 are disposed on both sides in the path width direction H relative to the power receiving device 4.

In the present embodiment, the power receiving device 4 includes a pick-up coil 40. Alternating-current power is induced in the pick-up coil 40 by a magnetic field generated around the power feeding lines 11 to which an alternating current has been supplied. The alternating-current power is converted into a direct current by a power receiving circuit including a rectifier circuit, a smoothing capacitor, and so forth, and the direct current is supplied to the above-described drive motor 14, and various actuators, and so forth.

Figure 3:
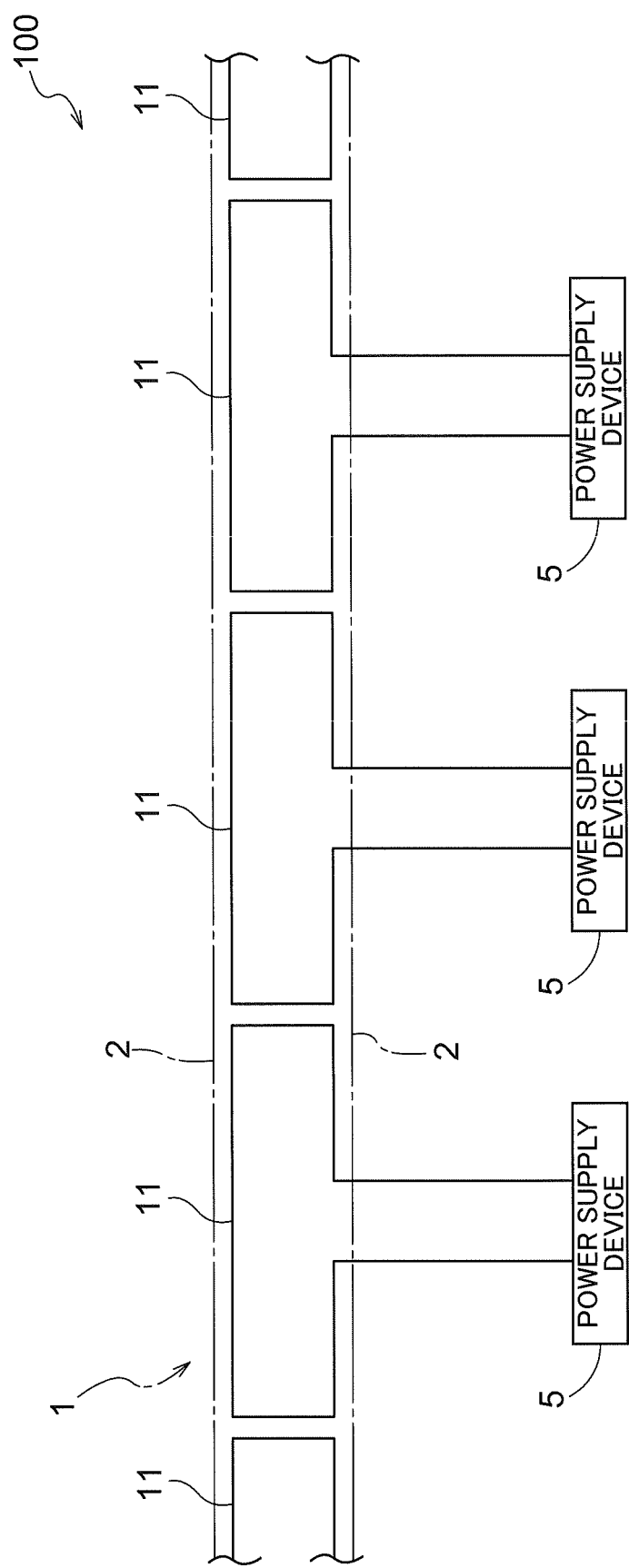
FIG. 3 is a schematic diagram showing a configuration of the contactless power feeding facility according to the first embodiment.

The contactless power feeding facility 100 is configured to supply power in a contactless manner to the power receiving device 4. As shown in FIG. 3, the contactless power feeding facility 100 includes a plurality of power feeding lines 11 arranged side by side along a movement path 1 of a moving body 3 including a power receiving device 4, and power supply devices 5 respectively connected to the power feeding lines 11 and configured to supply an alternating current to the respective power feeding lines 11. In this manner, the contactless power feeding facility 100 includes a plurality of sets of power feeding lines 11 and power supply devices 5. The purpose for this is to suppress, for example, reduction in the power transmission efficiency in the power feeding lines 11 or prevent the entire facility from stopping in the case of failure in a relatively large-scale article transport facility 200 (see FIG. 1) including one large annular main path 1a and a plurality of annular sub-paths 1b that are smaller than the main path 1a, as in the case of the present embodiment.

Although not shown, each of the plurality of power supply devices 5 includes a power supply circuit that supplies an alternating current to the power feeding line 11 connected to the power supply device 5, and a power control unit that controls the power supply circuit. The power supply circuit is configured mainly by a switching power supply circuit including an inverter circuit, for example. The power control unit controls, based on a command value, the duty of a switching control signal for switching a switching element constituting the inverter circuit. For example, the power control unit causes the power supply circuit to output an alternating current by Pulse Width Modulation (PWM). Here, the command value is, for example, a current value (which may be either an effective value or a peak value (peak-to-peak value)), or a duty in the PWM control.

Figure 4:
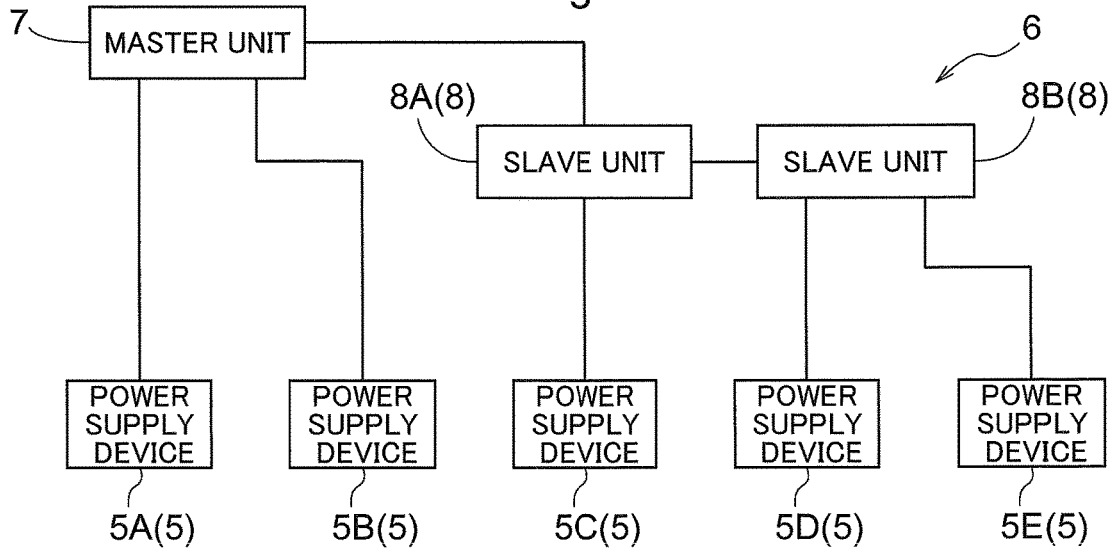
FIG. 4 is a diagram showing an exemplary configuration of a synchronization system.

As shown in FIG. 4, the contactless power feeding facility 100 further includes a synchronization system 6 configured to synchronize phases of the alternating currents of the plurality of power supply devices 5. The synchronization system 6 includes a master unit 7 configured to transmit a synchronization signal having a predetermined period, and at least one slave unit 8 connected downstream to the master unit 7 and configured to receive the synchronization signal from the master unit 7.

The slave unit 8 is directly connected to the master unit 7, or indirectly connected to the master unit 7 via another slave unit 8. Further, the slave unit 8 is connected to at least one of the power supply devices 5. In the present embodiment, the master unit 7 is also connected to at least one of the power supply devices 5. The power supply device 5 connected to the slave unit 8 receives the synchronization signal from the slave unit 8, and supplies an alternating current to the corresponding power feeding line 11 in accordance with the synchronization signal. The power supply device 5 connected to the master unit 7 receives the synchronization signal from the master unit 7, and supplies an alternating current to the corresponding power feeding line 11 in accordance with the synchronization signal.

In the example shown in FIG. 4, the synchronization system 6 includes two slave units 8. In the following description, the two slave units 8 are referred to as a "first slave unit 8A" and a "second slave unit 8B", respectively. The first slave unit 8A is directly connected to the master unit 7. The second slave unit 8B is indirectly connected to the master unit 7 via the first slave unit 8A.

In the example shown in FIG. 4, two power supply devices 5 are directly connected to the master unit 7. One other power supply device 5 is directly connected to the first slave unit 8A. Two other power supply devices 5 are directly connected to the second slave unit 8B. In the following description, the two power supply devices 5 directly connected to the master unit 7 are referred to as a "first power supply device 5A" and a "second power supply device 5B", respectively. The power supply device 5 directly connected to the first slave unit 8A is referred to as a "third power supply device 5C". The two power supply devices 5 directly connected to the second slave unit 8B are referred to as a "fourth power supply device 5D" and a "fifth power supply device 5E", respectively.

Figure 5:
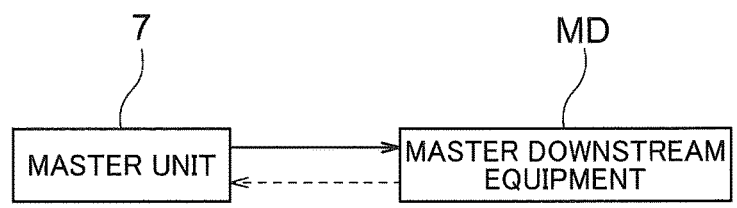
FIG. 5 is a diagram showing a relationship between a master unit and master downstream equipment.
Figure 6:
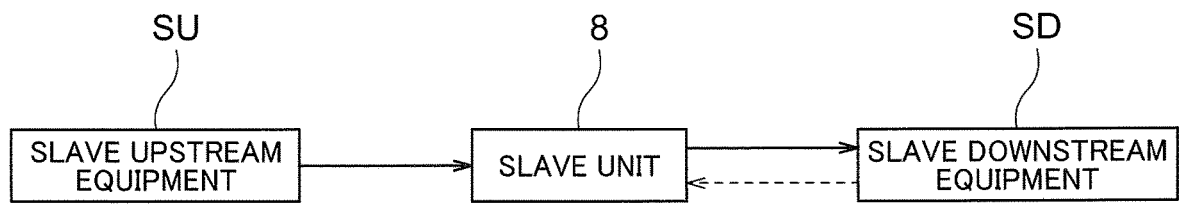
FIG. 6 is a diagram showing a relationship between a slave unit, slave upstream equipment, and slave downstream equipment.

As shown in FIG. 5, in the following description, the slave unit 8 directly connected downstream to the master unit 7 is referred to as "master downstream equipment MD". As shown in FIG. 6, the master unit 7 or another slave unit 8 directly connected upstream to the slave unit 8 is referred to as "slave upstream equipment SU". The power supply device 5 and another slave unit 8 directly connected downstream to the slave unit 8 are each referred to as "slave downstream equipment SD".

In the example shown in FIG. 4, the first slave unit 8A corresponds to the master downstream equipment MD. As described above, in the present example, the first power supply device 5A and the second power supply device 5B are directly connected to the master unit 7. Therefore, the power supply device 5 directly connected downstream to the master unit 7 is also referred to as "master downstream equipment MD". Accordingly, in the present example, the first power supply device 5A and the second power supply device 5B each also correspond to the master downstream equipment MD.

In the example shown in FIG. 4, in the case of defining the slave upstream equipment SU and the slave downstream equipment SD relative to the first slave unit 8A, the master unit 7 corresponds to the slave upstream equipment SU, and the second slave unit 8B and the third power supply device 5C each correspond to the slave downstream equipment SD. In the case of defining the slave upstream equipment SU and the slave downstream equipment SD relative to the second slave unit 8B, the first slave unit 8A corresponds to the slave upstream equipment SU, and the fourth power supply device 5D and the fifth power supply device 5E each correspond to the slave downstream equipment SD.

As shown in FIG. 7, in the present embodiment, the master unit 7 computes a first adjusted signal, which is the synchronization signal advanced in phase relative to a reference phase by a time corresponding to a first required time $\Delta t1$, which is the time required to transmit the synchronization signal from the master unit 7 to the master downstream equipment MD. Here, assuming that a synchronization signal with the reference phase is a "reference signal", the first adjusted signal is a signal advanced in phase from the reference signal by a time corresponding to the first required time $\Delta t1$. Here, the "time corresponding to the first required time $\Delta t1$" matches the first required time $\Delta t1$. Note that in the present embodiment, the reference signal is the synchronization signal generated inside the master unit 7.

The master unit 7 transmits the computed first adjusted signal to the master downstream equipment MD. Then, the master downstream equipment MD receives the first adjusted signal transmitted by the master unit 7. In the following, for the sake of convenience of description, the "first adjusted signal" refers to the first adjusted signal at the point in time when it is calculated by the master unit 7. The synchronization signal at the point in time when it is received by the master downstream equipment MD after transmitted as the first adjusted signal by the master unit 7 is referred to as a "first received signal".

In the present embodiment, the synchronization signal (first adjusted signal) computed by the master unit 7 is delayed in phase by the first required time $\Delta t1$ as it is transmitted from the master unit 7 to the master downstream equipment MD. That is, the synchronization signal (first received signal) received by the master downstream equipment MD is delayed in phase relative to the synchronization signal (first adjusted signal) computed by the master unit 7 by the first required time $\Delta t1$ In this manner, the master unit 7 computes the first adjusted signal taking into account a delay corresponding to the first required time $\Delta t1$, which is the time required to transmit the synchronization signal from the master unit 7 to the master downstream equipment MD. Accordingly, the phase of the first received signal can be very close to the phase of the reference signal (reference phase). Therefore, if the master downstream equipment MD is the power supply device 5 (here, the first power supply device 5A and the second power supply device 5B), the phase of the alternating current supplied by the power supply device 5 to the corresponding power feeding line 11 in accordance with the first received signal can be very close to the phase of the alternating current corresponding to the reference signal.

As shown in FIG. 8, in the present embodiment, the slave unit 8 computes a second adjusted signal advanced in phase relative to the phase of the synchronization signal received from the slave upstream equipment SU by a time corresponding to the sum of a second required time $\Delta t2$, which is the time required to transmit the synchronization signal from the slave unit 8 to the slave downstream equipment SD, and a processing time $\Delta t3$ of the synchronization signal inside the slave unit 8. Here, assuming that the synchronization signal at the point in time when it is received by the slave unit 8 from the slave upstream equipment SU is a "second received signal", the second adjusted signal is a signal advanced in phase from the second received signal by a time corresponding to the sum of the second required time $\Delta t2$ and the processing time $\Delta t3$. Here, the "time corresponding to the sum of the second required time $\Delta t2$ and the processing time Δt3" matches the sum of the second required time Δt2 and the processing time Δt3. The processing time (here, the processing time Δt3) of the synchronization signal in the slave unit 8 is the time required for the slave unit 8 to transmit the synchronization signal to the downstream side after receiving the synchronization signal from the upstream side (the time required to relay the synchronization signal). That is, the processing time of the synchronization signal is the time corresponding to a phase delay caused when the slave unit 8 transmits the synchronization signal received from the upstream side to the downstream side as-is (without phase adjustment).

The slave unit 8 transmits the computed second adjusted signal to the slave downstream equipment SD. Then, the slave downstream equipment SD receives the second adjusted signal transmitted by the slave unit 8. In the following, for the sake of convenience of description, the "second adjusted signal" refers to the second adjusted signal at the point in time when it is calculated by the slave unit 8. The synchronization signal at the point in time when it is received by the slave downstream equipment SD after transmitted as the second adjusted signal from the slave unit 8A is referred to as a "third received signal".

In the present embodiment, the synchronization signal (second adjusted signal) computed by the slave unit 8 is delayed in phase by the second required time Δt2 as it is transmitted from the slave unit 8 to the slave downstream equipment SD, and is delayed in phase by the processing time Δt3 as the synchronization signal is processed inside the slave unit 8. That is, the synchronization signal (third received signal) received by the slave downstream equipment SD is delayed in phase relative to the synchronization signal (second adjusted signal) computed by the slave unit 8 by the sum of the second required time Δt2 and the processing time Δt3. In this manner, the slave unit 8 computes the second adjusted signal taking into account a delay corresponding to the second required time Δt2, which is the time required to transmit the synchronization signal from the slave unit 8 to the slave downstream equipment SD, and the processing time Δt3 of the synchronization signal inside the slave unit 8. Accordingly, the phase of the third received signal can be very close to the phase of the second received signal, which is the synchronization signal received by the slave unit 8 from the slave upstream equipment SU.

In the example shown in FIG. 4, in the case of defining the slave upstream equipment SU and the slave downstream equipment SD relative to the first slave unit 8A, the second received signal is the synchronization signal received by the first slave unit 8A from the master unit 7. In this case, the first slave unit 8A also corresponds to the master downstream equipment MD, and therefore the second received signal matches the first received signal, which is the synchronization signal received by the master downstream equipment MD. As described above, the phase of the first received signal is very close to the phase of the reference signal (reference phase). Therefore, in the case of defining the slave upstream equipment SU and the slave downstream equipment SD relative to the first slave unit 8A, the phase of the second received signal is very close to the phase of the reference signal (reference phase). As described above, the phase of the second received signal is very close to the phase of the third received signal. Therefore, in the case of defining the slave upstream equipment SU and the slave downstream equipment SD relative to the first slave unit 8A, the phase of the third received signal is very close to the phase of the reference signal (reference phase). Accordingly, if the slave downstream equipment SD is the power supply device 5 (here, the third power supply device 5C), the phase of the alternating current supplied by the power supply device 5 to the corresponding power feeding line 11 in accordance with the third received signal can be very close to the phase of the alternating current corresponding to the reference signal.

In the example shown in FIG. 4, in the case of defining the slave upstream equipment SU and the slave downstream equipment SD relative to the second slave unit 8B, the second received signal is the synchronization signal received by the second slave unit 8B from the first slave unit 8A. In this case, the second slave unit 8B also corresponds to the slave downstream equipment SD in the case of defining the slave upstream equipment SU and the slave downstream equipment SD relative to the first slave unit 8A. Therefore, the second received signal matches the third received signal in the case of defining the slave upstream equipment SU and the slave downstream equipment SD relative to the first slave unit 8A. As described above, the phase of the third received signal in the case of defining the slave upstream equipment SU and the slave downstream equipment SD relative to the first slave unit 8A is very close to the phase of the reference signal (reference phase). Therefore, in the case of defining the slave upstream equipment SU and the slave downstream equipment SD relative to the second slave unit 8B, the phase of the third received signal is very close to the phase of the reference signal (reference phase). Accordingly, if the slave downstream equipment SD is the power supply device 5 (here, the fourth power supply device 5D and the fifth power supply device 5E), the phase of the alternating current supplied by the power supply device 5 to the corresponding power feeding line 11 in accordance with the third received signal can be very close to the phase of the alternating current corresponding to the reference signal.

In the present embodiment, the master unit 7 is configured to transmit a first inspection signal to the master downstream equipment MD (see the solid arrow extending from the master unit 7 to the master downstream equipment MD in FIG. 5). The master downstream equipment MD is configured to transmit a first response signal to the master unit 7 (see the dashed arrow extending from the master downstream equipment MD to the master unit 7 in FIG. 5) in response to receiving the first inspection signal. The master unit 7 uses, as the first required time Δt1, half the time required from transmission of the first inspection signal to reception of the first response signal.

In the present embodiment, the slave unit 8 is configured to transmit a second inspection signal to the slave downstream equipment SD (see the solid arrow extending from the slave unit 8 to the slave downstream equipment SD in FIG. 6). The slave downstream equipment SD is configured to transmit a second response signal to the slave unit 8 (see the dashed arrow extending from the slave downstream equipment SD to the slave unit 8 in FIG. 6) in response to receiving the second inspection signal. The slave unit 8 uses, as the second required time Δt2, half the time required from transmission of the second inspection signal to reception of the second response signal.

2. Second Embodiment

A contactless power feeding facility 100 according to a second embodiment will be described below with reference to FIGS. 9 and 10. The present embodiment differs from the above first embodiment with regard to the computation of the synchronization signal performed by the master unit 7 and the slave unit 8. The following description focuses on differences from the above first embodiment. Note that aspects that are not specifically described below are similar to those of the above first embodiment.

Figure 9:
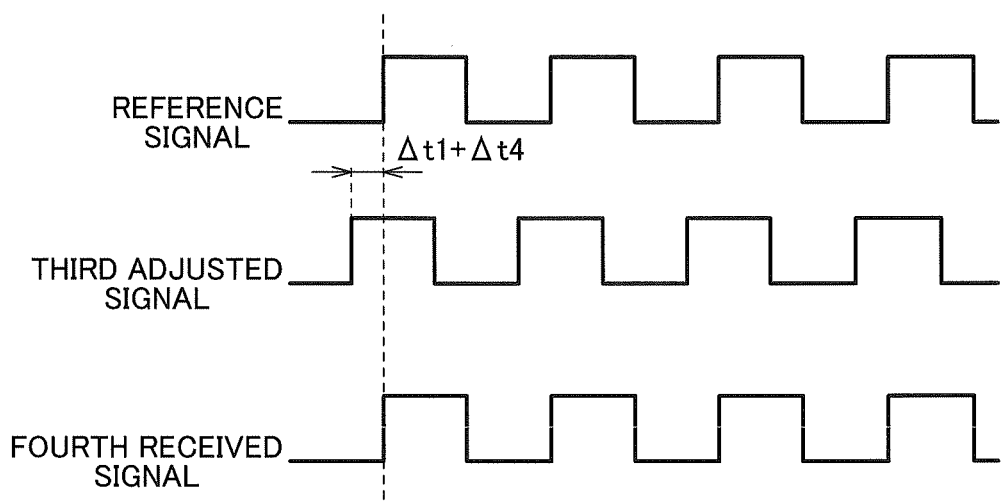
FIG. 9 is a diagram showing phases at various points in time of a synchronization signal transmitted from a master unit to master downstream equipment, according to a second embodiment.

As shown in FIG. 9, in the present embodiment, the master unit 7 computes a third adjusted signal, which is the synchronization signal advanced in phase relative to a reference phase by a time corresponding to the sum of a first required time $\Delta t1$, which is the time required to transmit the synchronization signal from the master unit 7 to the master downstream equipment MD, and a processing time $\Delta t4$ of the synchronization signal inside the master downstream equipment MD. Here, the "time corresponding to the sum of the first required time $\Delta t1$ and the processing time $\Delta t4$" matches the sum of the first required time $\Delta t1$ and the processing time $\Delta t4$.

The master unit 7 transmits the computed third adjusted signal to the master downstream equipment MD. Then, the master downstream equipment MD receives the third adjusted signal transmitted by the master unit 7. In the following, for the sake of convenience of description, the "third adjusted signal" refers to the third adjusted signal at the point in time when it is calculated by the master unit 7. The synchronization signal at the point in time when it is received by the master downstream equipment MD after transmitted as the third adjusted signal by the master unit 7, and furthermore the processing thereof (relay processing of the synchronization signal) inside the master downstream equipment MD has been completed is referred to as a "fourth received signal". That is, the phase of the fourth received signal matches the phase of the synchronization signal transmitted from the master downstream equipment MD to the downstream side, provided that the master downstream equipment MD transmits the synchronization signal received from the upstream side to the downstream side as-is.

Here, unlike the slave unit 8, the power supply device 5 does not transmit the received synchronization signal to equipment on the downstream side, but supplies an alternating current to the corresponding power feeding line 11 in accordance with the synchronization signal. Accordingly, in the present embodiment, if the master downstream equipment MD is the power supply device 5, the master unit 7 does not compute the third adjusted signal based on the processing time $\Delta t4$, but computes the first adjusted signal, and transmits the first adjusted signal to the power supply device 5 serving as the master downstream equipment MD, as in the case of the above first embodiment.

In the present embodiment, the synchronization signal (third adjusted signal) computed by the master unit 7 is delayed in phase by the first required time $\Delta t1$ as it is transmitted from the master unit 7 to the master downstream equipment MD, and is delayed in phase by the processing time $\Delta t4$ as the synchronization signal is processed inside the slave unit 8 serving as the master downstream equipment MD. That is, the synchronization signal (fourth received signal) that has been received by the master downstream equipment MD and for which the processing inside the master downstream equipment MD (relay processing of the synchronization signal) has been completed is delayed in phase relative to the synchronization signal (third adjusted signal) computed by the master unit 7 by the sum of the first required time $\Delta t1$ and the processing time $\Delta t4$. In this manner, the master unit 7 computes the third adjusted signal taking into account a delay corresponding to the first required time $\Delta t1$, which is the time required to transmit the synchronization signal from the master unit 7 to the master downstream equipment MD, and the processing time $\Delta t4$ of the synchronization signal inside the slave unit 8 serving as the master downstream equipment MD. Accordingly, the phase of the fourth received signal can be very close to the phase of the reference signal (reference phase).

Figure 10:
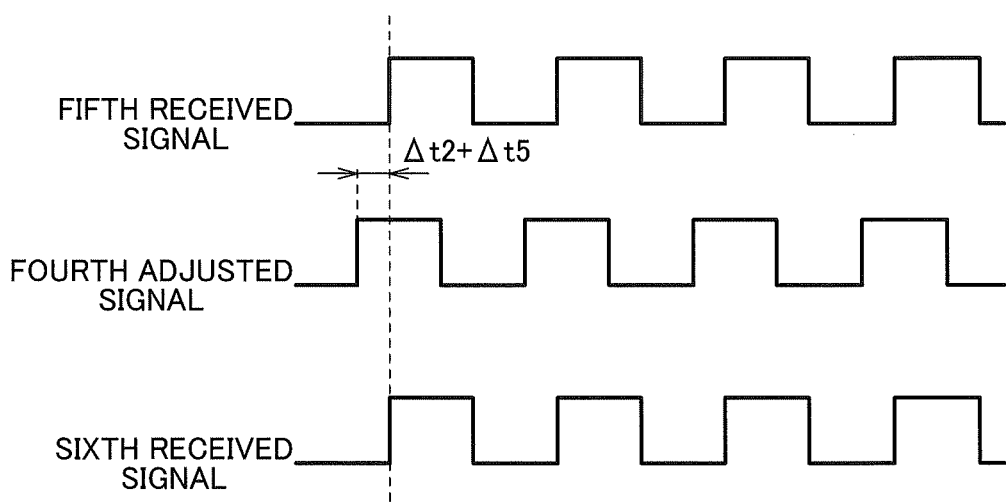
FIG. 10 is a diagram showing phases at various points in time of a synchronization signal transmitted from a slave unit to another slave unit serving as slave downstream equipment, according to the second embodiment.

As shown in FIG. 10, in the present embodiment, if the slave downstream equipment SD is another slave unit 8, the slave unit 8 computes a fourth adjusted signal advanced in phase relative to the phase of the synchronization signal received from the slave upstream equipment SU by a time corresponding to the sum of a second required time $\Delta t2$, which is the time required to transmit the synchronization signal from itself to the slave downstream equipment SD, and a processing time $\Delta t5$ of the synchronization signal inside the other slave unit 8 serving as the slave downstream equipment SD. Here, assuming that the synchronization signal at the point in time when it is received by the slave unit 8 from the slave upstream equipment SU, and furthermore the processing of the signal inside the slave unit 8 (relay processing of the synchronization signal) has been completed is a "fifth received signal", the fourth adjusted signal is a signal advanced in phase from the fifth received signal by a time corresponding to the sum of the second required time $\Delta t2$ and the processing time $\Delta t5$. Here, the "time corresponding to the second required time $\Delta t2$ and the processing time $\Delta t5$" matches the sum of the second required time $\Delta t2$ and the processing time $\Delta t5$.

The slave unit 8 transmits the computed fourth adjusted signal to another slave unit 8 serving as the slave downstream equipment SD. Then, the other slave unit 8 serving as the slave downstream equipment SD receives the fourth adjusted signal transmitted by the slave unit 8. In the following, for the sake of convenience of description, the "fourth adjusted signal" refers to the fourth adjusted signal at the point in time when it is calculated by the slave unit 8. The synchronization signal at the point in time when it is received by the other slave unit 8 serving as the slave downstream equipment SD after transmitted as the fourth adjusted signal from the slave unit 8, and furthermore the processing of the signal inside the slave unit 8 serving as the slave downstream equipment SD (relay processing of the synchronization signal) has been completed is referred to as a "sixth received signal". That is, the phase of the sixth received signal matches the phase of the synchronization signal transmitted from the slave downstream equipment SD to the downstream side, provided that the slave downstream equipment SD transmits the synchronization signal received from the upstream side to the downstream side as-is.

In the present embodiment, the synchronization signal (fourth adjusted signal) computed by the slave unit 8 is delayed in phase by the second required time $\Delta t2$ as it is transmitted from the slave unit 8 to the slave downstream equipment SD, and is delayed in phase by the processing time $\Delta t5$ as the synchronization signal is processed inside another slave unit 8 serving as the slave downstream equipment SD. That is, the synchronization signal (sixth received signal) that has been received by another slave unit 8 serving as the slave downstream equipment SD and for which the processing inside the other slave unit 8 serving as the slave downstream equipment SD (relay processing of the synchronization signal) has been completed is delayed in phase relative to the synchronization signal (fourth adjusted signal) computed by the slave unit 8 by the sum of the second required time $\Delta t2$ and the processing time $\Delta t5$. In this manner, the slave unit 8 computes the fourth adjusted signal taking into account a delay corresponding to the second required time $\Delta t2$, which is the time required to transmit the synchronization signal from the slave unit 8 to the slave downstream equipment SD, and the processing time $\Delta t5$ of the synchronization signal inside the other slave unit 8 serving as the slave downstream equipment SD. Accordingly, the phase of the sixth received signal can be very close to the phase of the fifth received signal, which is the synchronization signal at the point in time when it is received by the slave unit 8 from the slave upstream equipment SU, and furthermore the processing of the signal inside the slave unit 8 (relay processing of the synchronization signal) has been completed.

As shown in FIG. 11, in the present embodiment, if the slave downstream equipment SD is the power supply device 5, the slave unit 8 computes a fifth adjusted signal advanced in phase relative to the phase of the synchronization signal (fifth received signal) received from the slave upstream equipment SU by a time corresponding to the second required time $\Delta t2$ described above. Here, the "time corresponding to the second required time $\Delta t2$" matches the second required time $\Delta t2$.

The slave unit 8 transmits the computed fifth adjusted signal to the power supply device 5 serving as the slave downstream equipment SD. Then, the power supply device 5 serving as the slave downstream equipment SD receives the fifth adjusted signal transmitted by the slave unit 8. In the following, for the sake of convenience of description, the "fifth adjusted signal" refers to the fifth adjusted signal at the point in time when it is calculated by the slave unit 8. The synchronization signal at the point in time when it is received by the power supply device 5 serving as the slave downstream equipment SD after transmitted as the fifth adjusted signal by the slave unit 8 is referred to as a "seventh received signal".

In the present embodiment, the synchronization signal (fifth adjusted signal) computed by the slave unit 8 is delayed in phase by the second required time $\Delta t2$ as it is transmitted from the slave unit 8 to the power supply device 5 serving as the slave downstream equipment SD. That is, the synchronization signal (seventh received signal) received by the power supply device 5 serving as the slave downstream equipment SD is delayed in phase relative to the synchronization signal (fifth adjusted signal) computed by the slave unit 8 by the second required time $\Delta t2$. In this manner, the slave unit 8 computes the fifth adjusted signal taking into account a delay corresponding to the second required time $\Delta t2$, which is the time required to transmit the synchronization signal from the slave unit 8 to the power supply device 5 serving as the slave downstream equipment SD. Accordingly, the phase of the seventh received signal can be very close to the phase of the fifth received signal, which is the synchronization signal at a time in point when it is received by the slave unit 8 from the slave upstream equipment SU, and furthermore the processing of the signal inside the slave unit 8 (relay processing of the synchronization signal) has been completed.

In the example shown in FIG. 4, in the case of defining the slave upstream equipment SU and the slave downstream equipment SD relative to the first slave unit 8A, the fifth received signal is the synchronization signal received by the first slave unit 8A from the master unit 7. In this case, the first slave unit 8A also corresponds to the master downstream equipment MD, and therefore the fifth received signal matches the fourth received signal, which is the synchronization signal that has been received by the master downstream equipment MD and for which the processing inside the master downstream equipment MD (relay processing of the synchronization signal) has been completed. As described above, the phase of the fourth received signal is very close to the phase of the reference signal (reference phase). Therefore, in the case of defining the slave upstream equipment SU and the slave downstream equipment SD relative to the first slave unit 8A, the phase of the fifth received signal can be very close to the phase of the reference signal (reference phase). As described above, the phase of the fifth received signal is very close to the respective phases of the sixth received signal and the seventh received signal. Therefore, in the case of defining the slave upstream equipment SU and the slave downstream equipment SD relative to the first slave unit 8A, the respective phases of the sixth received signal and the seventh received signal are very close to the phase of the reference signal (reference phase). Accordingly, if the slave downstream equipment SD is the power supply device 5 (here, the third power supply device 5C), the phase of the alternating current supplied by the power supply device 5 to the corresponding power feeding line 11 in accordance with the seventh received signal can be very close to the phase of the alternating current corresponding to the reference signal (see FIG. 11).

In the example shown in FIG. 4, in the case of defining the slave upstream equipment SU and the slave downstream equipment SD relative to the second slave unit 8B, the fifth received signal is the synchronization signal received by the second slave unit 8B from the first slave unit 8A. In this case, the second slave unit 8B also corresponds to the slave downstream equipment SD in the case of defining the slave upstream equipment SU and the slave downstream equipment SD relative to the first slave unit 8A. Therefore, the fifth received signal matches the sixth received signal in the case of defining the slave upstream equipment SU and the slave downstream equipment SD relative to the first slave unit 8A. As described above, the phase of the sixth received signal in the case of defining the slave upstream equipment SU and the slave downstream equipment SD relative to the first slave unit 8A is very close to the phase of the reference signal (reference phase). Therefore, in the case of defining the slave upstream equipment SU and the slave downstream equipment SD relative to the second slave unit 8B, the phase of the sixth received signal is very close to the phase of the reference signal (reference phase).

As described above, the phase of the fifth received signal and the phase of the seventh received signal are very close to each other. Therefore, in the case of defining the slave upstream equipment SU and the slave downstream equipment SD relative to the second slave unit 8B, the phase of the seventh received signal is very close to the phase of the reference signal (reference phase). Accordingly, if the slave downstream equipment SD is the power supply device 5 (here, the fourth power supply device 5D and the fifth power supply device 5E), the phase of the alternating current supplied by the power supply device 5 to the corresponding power feeding line 11 in accordance with the seventh received signal can be very close to the phase of the alternating current corresponding to the reference signal (see FIG. 11).

3. Other Embodiments (1) The above embodiments are described by way of an example of a configuration in which the synchronization system 6 includes two slave units 8 (the first slave unit 8A and the second slave unit 8B). However, the present disclosure is not limited to such a configuration, and it is possible to adopt a configuration in which the synchronization system 6 includes one slave unit 8, or a configuration in which the synchronization system 6 includes three or more slave units 8.

(2) The above embodiments are described by way of an example of a configuration in which one power supply device 5 (the third power supply device 5C) is connected to the first slave unit 8A, and two power supply devices 5 (the fourth power supply device 5D and the fifth power supply device 5E) are connected to the second slave unit 8B. However, the present disclosure is not limited to such a configuration, and it is possible to adopt a configuration in which three or more power supply devices 5 are connected to the slave unit 8.

(3) The above embodiments are described by way of an example of a configuration in which two power supply devices 5 (the first power supply device 5A and the second power supply device 5B) are directly connected to the master unit 7. However, the present disclosure is not limited to such a configuration, and it is possible to adopt a configuration in which one power supply device 5 is directly connected to the master unit 7, or a configuration in which three or more power supply devices 5 are directly connected to the master unit 7. Alternatively, it is possible to adopt a configuration in which no power supply device 5 is directly connected to the master unit 7.

(4) The above first embodiment is described by way of an example of a configuration in which the "time corresponding to the first required time $\Delta t1$" matches the first required time $\Delta t1$. The above first embodiment is also described by way of an example of a configuration in which the "time corresponding to the sum of the second required time $\Delta t2$ and the processing time $\Delta t3$" matches the sum of the second required time $\Delta t2$ and the processing time $\Delta t3$. However, the present disclosure is not limited to these configurations. For example, the "time corresponding to the first required time $\Delta t1$" may be a value calculated by performing predetermined computation on the first required time $\Delta t1$. Similarly, the "time corresponding to the sum of the second required time $\Delta t2$ and the processing time $\Delta t3$" may be a value calculated by performing predetermined computation on the sum of the second required time $\Delta t2$ and the processing time $\Delta t3$.

(5) The above second embodiment is described by way of an example of a configuration in which the "time corresponding to the sum of the first required time $\Delta t1$ and the processing time $\Delta t4$" matches the sum of the first required time $\Delta t1$ and the processing time $\Delta t4$. The above second embodiment is also described by way of an example of a configuration in which the "time corresponding to the sum of the second required time $\Delta t2$ and the processing time $\Delta t5$" matches the sum of the second required time $\Delta t2$ and the processing time $\Delta t5$. The above second embodiment is also described by way of an example of a configuration in which the "time corresponding to the second required time $\Delta t2$" matches the second required time $\Delta t2$. However, the present disclosure is not limited to these configurations. For example, the "time corresponding to the sum of the first required time $\Delta t1$ and the processing time $\Delta t4$" may be a value calculated by performing predetermined computation on the sum of the first required time $\Delta t1$ and the processing time $\Delta t4$. The "time corresponding to the sum of the second required time $\Delta t2$ and the processing time $\Delta t5$" may be a value calculated by performing predetermined computation on the sum of the second required time $\Delta t2$ and the processing time $\Delta t5$. Similarly, the "time corresponding to the second required time $\Delta t2$" may be a value calculated by performing predetermined computation on the second required time $\Delta t2$.

(6) The above embodiments are described by way of an example of a configuration in which the master unit 7 uses, as the first required time $\Delta t1$, half the time required from transmission of the first inspection signal to reception of the first response signal. The above embodiments are also described by way of an example of a configuration in which the slave unit 8 uses, as the second required time $\Delta t2$, half the time required from transmission of the second inspection signal to reception of the second response signal. However, the present disclosure is not limited to these configurations. For example, it is possible to adopt a configuration in which the first required time $\Delta t1$ and the second required time $\Delta t2$ are each calculated by performing division using the length of a transmission path of the synchronization signal as a dividend and using the transmission speed of the synchronization signal as a divisor.

(7) Note that the configurations disclosed in the embodiments described above are applicable in combination with configurations disclosed in other embodiments, as long as no inconsistency arises. With regard to the other configurations as well, the embodiments disclosed herein are illustrative in all respects. Therefore, various modifications and alterations may be made as appropriate without departing from the gist of the present disclosure.

4. Outline of the Embodiments

An outline of the above-described contactless power feeding facility will be described below.

1. A contactless power feeding facility configured to supply power in a contactless manner to a power receiving device, the contactless power feeding facility includes:

a plurality of power feeding lines side by side along a movement path of a moving body including the power receiving device; and a plurality of power supply devices respectively connected to the power feeding lines and configured to supply alternating currents to the power feeding lines, wherein the contactless power feeding facility further includes a synchronization system configured to synchronize phases of the alternating currents of the plurality of power supply devices, the synchronization system includes:
a master unit configured to transmit a synchronization signal having a predetermined period; and
at least one slave unit connected downstream to the master unit and configured to receive the synchronization signal from the master unit, the slave unit is directly connected to the master unit, or indirectly connected to the master unit via another slave unit, and is further connected to at least one of the power supply devices, the master unit is configured to (i) compute a first adjusted signal, which is the synchronization signal advanced in phase relative to a reference phase by a time corresponding to a first required time, which is a time required to transmit the synchronization signal from the master unit to master downstream equipment, which is a slave unit directly connected downstream to the master unit, and (ii) transmit the first adjusted signal to the master downstream equipment, and the slave unit is configured to:
compute a second adjusted signal advanced in phase relative to a phase of the synchronization signal received from slave upstream equipment, which is the master unit or another slave unit directly connected upstream to the slave unit, by a time corresponding to a sum of (i) a second required time, which is a time required to transmit the synchronization signal from the slave unit to slave downstream equipment, which includes a power supply device and another slave unit directly connected downstream to the slave unit, and (ii) a processing time of the synchronization signal inside the slave unit; and transmit the second adjusted signal to the slave downstream equipment.

According to this configuration, the master unit computes the first adjusted signal taking into account a delay corresponding to the time required to transmit the synchronization signal from the master unit to the master downstream equipment. Accordingly, the phase of the synchronization signal received by the master downstream equipment from the master unit can be very close to the reference phase.

According to this configuration, the slave unit computes the second adjusted signal taking into account a delay corresponding to the time required to transmit the synchronization signal from the slave unit to the slave downstream equipment, and the processing time of the synchronization signal inside the slave unit. Accordingly, the phase of the synchronization signal received by the slave downstream equipment from the slave unit can be very close to the phase of the synchronization signal received by the slave unit from the slave upstream equipment.

As described above, according to this configuration, the phase of the synchronization signal received by the plurality of power supply devices and the slave unit can be very close to the reference phase. Therefore, even in the case where the time required to transmit the synchronization signal from the master unit to the plurality of power supply devices varies, the phases of the alternating currents respectively supplied by the plurality of power supply devices to the corresponding power feeding lines can be appropriately synchronized. Accordingly, it is possible to increase the accuracy in synchronizing the phases of the alternating currents supplied to the plurality of power feeding lines.

A contactless power feeding facility configured to supply power in a contactless manner to a power receiving device, the contactless power feeding facility includes:

a plurality of power feeding lines side by side along a movement path of a moving body including the power receiving device; and a plurality of power supply devices respectively connected to the power feeding lines and configured to supply alternating currents to the power feeding lines, wherein the contactless power feeding facility further includes a synchronization system configured to synchronize phases of the alternating currents of the plurality of power supply devices, the synchronization system includes:

a master unit configured to transmit a synchronization signal having a predetermined period; and at least one slave unit connected downstream to the master unit and configured to receive the synchronization signal from the master unit, the slave unit is directly connected to the master unit, or indirectly connected to the master unit via another slave unit, and is further connected to at least one of the power supply devices, the master unit is configured to (i) compute a third adjusted signal, which is the synchronization signal advanced in phase relative to a reference phase by a time corresponding to a sum of a first required time, which is a time required to transmit the synchronization signal from the master unit to master downstream equipment, which is a slave unit directly connected downstream to the master unit, and a processing time of the synchronization signal inside the master downstream equipment, and (ii) transmit the third adjusted signal to the master downstream equipment, and the slave unit is configured to:

in response to slave downstream equipment, which includes one of the plurality of power supply devices and another slave unit directly connected downstream to the slave unit, being another slave unit directly connected downstream to the slave unit, compute a fourth adjusted signal advanced in phase relative to a phase of the synchronization signal received from slave upstream equipment, which is the master unit or another slave unit directly connected upstream to the slave unit, by a time corresponding to a sum of (i) a second required time, which is a time required to transmit the synchronization signal from the slave unit to the slave downstream equipment, and (ii) a processing time of the synchronization signal inside the slave downstream equipment, and transmit the fourth adjusted signal to the slave downstream equipment; and in response to the slave downstream equipment being the one of the plurality of power supply devices directly connected downstream to the slave unit, compute a fifth adjusted signal advanced in phase relative to a phase of the synchronization signal received from the slave upstream equipment by a time corresponding to the second required time, and transmit the fifth adjusted signal to the slave downstream equipment.

According to this configuration, the master unit computes the third adjusted signal taking into account a delay corresponding to the time required to transmit the synchronization signal from the master unit to the master downstream equipment, and the processing time of the synchronization signal inside the master downstream equipment. Accordingly, the phase of the synchronization signal received by the master downstream equipment from the master unit can be very close to the reference phase.

According to this configuration, if the slave downstream equipment is another slave unit, the slave unit computes the fourth adjusted signal taking into account a delay corresponding to the time required to transmit the synchronization signal from the slave unit to the slave downstream equipment, and the processing time of the synchronization signal inside the slave downstream equipment. If the slave downstream equipment is the power supply device, the slave unit computes the fifth adjusted signal taking into account a delay corresponding to the time required to transmit the synchronization signal from the slave unit to the slave downstream equipment. Accordingly, the phase of the synchronization signal received by the slave downstream equipment from the slave unit can be very close to the phase of the synchronization signal received by the slave unit from the slave upstream equipment.

As described above, according to this configuration, the phase of the synchronization signal received by the plurality of power supply devices and the slave unit can be very close to the reference phase. Therefore, even in the case where the time required to transmit the synchronization signal from the master unit to the plurality of power supply devices varies, the phases of the alternating currents respectively supplied by the plurality of power supply devices to the corresponding power feeding lines can be appropriately synchronized. Accordingly, it is possible to increase the accuracy in synchronizing the phases of the alternating currents supplied to the plurality of power feeding lines.

Here, it is preferable that the master unit is configured to transmit a first inspection signal to the master downstream equipment, the master downstream equipment is configured to transmit a first response signal to the master unit in response to receiving the first inspection signal, and the master unit uses, as the first required time, half a time required from transmission of the first inspection signal to reception of the first response signal.

According to this configuration, it is possible to accurately determine the first required time, which is the time required for transmission from the master unit to the master downstream equipment.

Also, it is preferable that the slave unit is configured transmit a second inspection signal to the slave downstream equipment, the slave downstream equipment is configured to transmit a second response signal to the slave unit in response to receiving the second inspection signal, and the slave unit uses, as the second required time, half a time required from transmission of the second inspection signal to reception of the second response signal.

According to this configuration, it is possible to accurately determine the second required time, which is the time required for transmission from the slave unit to the slave downstream equipment.

The technique according to the present disclosure is applicable to a contactless power feeding facility configured to supply power in a contactless manner to a power receiving device, the contactless power feeding facility including a plurality of power feeding lines side by side along a movement path of a moving body including the power receiving device and a plurality of power supply devices respectively connected to the power feeding lines and configured to supply alternating currents to the power feeding lines.

What is claimed is:

1. A contactless power feeding facility configured to supply power in a contactless manner to a power receiving device, the contactless power feeding facility comprising:
   a plurality of power feeding lines side by side along a movement path of a moving body including the power receiving device; and
   a plurality of power supply devices respectively connected to the power feeding lines and configured to supply alternating currents to the power feeding lines,
   wherein the contactless power feeding facility further comprises a synchronization system configured to synchronize phases of the alternating currents of the plurality of power supply devices,
   wherein the synchronization system comprises:
      a master unit configured to transmit a synchronization signal having a predetermined period; and
      at least one slave unit connected downstream to the master unit and configured to receive the synchronization signal from the master unit,
   wherein the slave unit is directly connected to the master unit, or indirectly connected to the master unit via another slave unit, and is further connected to at least one of the power supply devices,
   wherein the master unit is configured to (i) compute a first adjusted signal, which is the synchronization signal advanced in phase relative to a reference phase by a time corresponding to a first required time, which is a time required to transmit the synchronization signal from the master unit to master downstream equipment, which is a slave unit directly connected downstream to the master unit, and (ii) transmit the first adjusted signal to the master downstream equipment, and
   wherein the slave unit is configured to:
      compute a second adjusted signal advanced in phase relative to a phase of the synchronization signal received from slave upstream equipment, which is the master unit or another slave unit directly connected upstream to the slave unit, by a time corresponding to a sum of (i) a second required time, which is a time required to transmit the synchronization signal from the slave unit to slave downstream equipment, which includes one of the plurality of power supply devices and another slave unit directly connected downstream to the slave unit, and (ii) a processing time of the synchronization signal inside the slave unit; and
      transmit the second adjusted signal to the slave downstream equipment.

2. The contactless power feeding facility according to claim 1, wherein:
   the master unit is configured to transmit a first inspection signal to the master downstream equipment,
   the master downstream equipment is configured to transmit a first response signal to the master unit in response to receiving the first inspection signal, and
   the master unit uses, as the first required time, half a time required from transmission of the first inspection signal to reception of the first response signal.

3. The contactless power feeding facility according to claim 1, wherein:
   the slave unit is configured transmit a second inspection signal to the slave downstream equipment,
   the slave downstream equipment is configured to transmit a second response signal to the slave unit in response to receiving the second inspection signal, and
   the slave unit uses, as the second required time, half a time required from transmission of the second inspection signal to reception of the second response signal.

4. A contactless power feeding facility configured to supply power in a contactless manner to a power receiving device, the contactless power feeding facility comprising:
   a plurality of power feeding lines side by side along a movement path of a moving body including the power receiving device; and
   a plurality of power supply devices respectively connected to the power feeding lines and configured to supply alternating currents to the power feeding lines,
   wherein the contactless power feeding facility further comprises a synchronization system configured to synchronize phases of the alternating currents of the plurality of power supply devices,
   wherein the synchronization system comprises:
      a master unit configured to transmit a synchronization signal having a predetermined period; and
      at least one slave unit connected downstream to the master unit and configured to receive the synchronization signal from the master unit,
   wherein the slave unit is directly connected to the master unit, or indirectly connected to the master unit via another slave unit, and is further connected to at least one of the power supply devices,
   wherein the master unit is configured to (i) compute a third adjusted signal, which is the synchronization signal advanced in phase relative to a reference phase by a time corresponding to a sum of a first required time, which is a time required to transmit the synchronization signal from the master unit to master downstream equipment, which is a slave unit directly connected downstream to the master unit, and a processing time of the synchronization signal inside the master downstream equipment, and (ii) transmit the third adjusted signal to the master downstream equipment, and wherein the slave unit is configured to:
in response to slave downstream equipment, which includes one of the plurality of power supply devices and another slave unit directly connected downstream to the slave unit, being another slave unit directly connected downstream to the slave unit, compute a fourth adjusted signal advanced in phase relative to a phase of the synchronization signal received from slave upstream equipment, which is the master unit or another slave unit directly connected upstream to the slave unit, by a time corresponding to a sum of (i) a second required time, which is a time required to transmit the synchronization signal from the slave unit to the slave downstream equipment, and (ii) a processing time of the synchronization signal inside the slave downstream equipment, and transmit the fourth adjusted signal to the slave downstream equipment; and in response to the slave downstream equipment being the one of the plurality of power supply devices directly connected downstream to the slave unit, compute a fifth adjusted signal advanced in phase relative to a phase of the synchronization signal received from the slave upstream equipment by a time corresponding to the second required time, and transmit the fifth adjusted signal to the slave downstream equipment.

5. The contactless power feeding facility according to claim 4, wherein:
the master unit is configured to transmit a first inspection signal to the master downstream equipment,
the master downstream equipment is configured to transmit a first response signal to the master unit in response to receiving the first inspection signal, and
the master unit uses, as the first required time, half a time required from transmission of the first inspection signal to reception of the first response signal.

6. The contactless power feeding facility according to claim 4, wherein:
the slave unit is configured transmit a second inspection signal to the slave downstream equipment,
the slave downstream equipment is configured to transmit a second response signal to the slave unit in response to receiving the second inspection signal, and
the slave unit uses, as the second required time, half a time required from transmission of the second inspection signal to reception of the second response signal.

* * * * *

UNITED STATES PATENT AND TRADEMARK OFFICE
CERTIFICATE OF CORRECTION

| | | |
|---|---|---|
| PATENT NO. | : 12,015,280 B2 | Page 1 of 1 |
| APPLICATION NO. | : 18/100796 | |
| DATED | : June 18, 2024 | |
| INVENTOR(S) | : Keiji Nishimura | |

It is certified that error appears in the above-identified patent and that said Letters Patent is hereby corrected as shown below:

In the Claims

Column 20, Line 32, Claim 3, after "configured" insert -- to --

Column 22, Line 20, Claim 6, after "configured" insert -- to --

Signed and Sealed this
Seventeenth Day of September, 2024

*Katherine Kelly Vidal*

Katherine Kelly Vidal
*Director of the United States Patent and Trademark Office*